United States Patent
Raines (10) Patent No.: US 7,172,083 B1
(45) Date of Patent: Feb. 6, 2007

(54) MOBILE HYDRAULIC HOIST

(76) Inventor: Harry F. Raines, 410 N. 12th Streetr, Murphysboro, IL (US) 62966

( * ) Notice: Subject to any disclaimer, the term of this patent is extended or adjusted under 35 U.S.C. 154(b) by 265 days.

(21) Appl. No.: 10/654,822

(22) Filed: Sep. 3, 2003

Related U.S. Application Data (60) Provisional application No. 60/408,982, filed on Sep. 9, 2002.

(51) Int. Cl.
B60P 1/54 (2006.01)
(52) U.S. Cl. .............. 212/261; 212/292; 212/303; 212/901; 414/542
(58) Field of Classification Search ........... 212/180, 212/901, 261, 292; 414/542, 543
See application file for complete search history.

(56) References Cited

U.S. PATENT DOCUMENTS

| | | | | |
|---|---|---|---|---|
| 1,396,250 A * | 11/1921 | Burke | ......... | 212/292 |
| 1,399,351 A * | 12/1921 | Lee | ......... | 414/739 |
| 2,550,185 A * | 4/1951 | Busch | ......... | 414/541 |
| 2,822,931 A * | 2/1958 | Sparrow | ......... | 414/495 |
| 2,974,809 A | 3/1961 | Sellers | | |
| 3,024,925 A * | 3/1962 | Werner et al. | ......... | 414/543 |
| 3,059,785 A * | 10/1962 | Buckeye | ......... | 414/728 |
| 3,145,857 A * | 8/1964 | Hayman et al. | ......... | 414/563 |
| 3,378,155 A | 4/1968 | Steiner | | |
| 3,400,844 A * | 9/1968 | Overstreet | ......... | 414/500 |
| 3,794,296 A * | 2/1974 | Hasstedt | ......... | 254/8 B |
| 3,843,093 A * | 10/1974 | Thompson et al. | ......... | 254/325 |
| 3,958,707 A * | 5/1976 | Deppe | ......... | 414/458 |
| 4,049,143 A | 9/1977 | Hatakka | | |
| 4,090,625 A | 5/1978 | Walters | | |
| 4,103,799 A * | 8/1978 | Perez | ......... | 414/563 |
| 4,190,233 A * | 2/1980 | Godfrey | ......... | 254/4 B |
| 4,213,728 A | 7/1980 | McKenzie | | |
| 4,523,888 A * | 6/1985 | Pezzner et al. | ......... | 414/680 |
| 4,770,304 A | 9/1988 | Woods | | |
| 4,925,039 A | 5/1990 | Macris | | |
| 5,174,550 A * | 12/1992 | Pittman | ......... | 254/420 |
| 5,211,526 A | 5/1993 | Robinette | | |
| 5,423,652 A * | 6/1995 | Thiede | ......... | 414/543 |
| 5,678,977 A | 10/1997 | Nordlund | | |
| 5,725,346 A * | 3/1998 | Davina | ......... | 414/111 |
| 5,800,117 A * | 9/1998 | Milton | ......... | 414/540 |
| 5,908,279 A * | 6/1999 | Mote | ......... | 414/542 |
| 6,065,621 A * | 5/2000 | Fatemi et al. | ......... | 212/301 |
| 6,688,836 B2 * | 2/2004 | Gourand | ......... | 414/543 |

* cited by examiner

Primary Examiner—Thomas J. Brahan
(74) Attorney, Agent, or Firm—Thomas E. Frantz (57) ABSTRACT

A mobile hydraulic hoist unit which is readily maneuverable to a position straddling a load and then conveniently operated to lift and securely transport such load over a variety of terrains and surfaces and to safely and accurately deposit that load at a specific location. The hoist unit comprises a generally "U" shaped base frame having spaced side members provided with multi-terrain wheel assemblies, a closed forward end having a hitch member for releasable attachment to a towing vehicle, a rearwardly open center section adapted to receive and straddle the load, a power cylinder, a boom operated by the power cylinder for lifting and securely holding the load in a transport position during movement of the hoist unit and for accurately depositing the load at the desired destination. The invention also includes but is not limited to the use of removable support means to assist in supporting and stabilizing the load during movement of the hoist unit, and the use of boom assemblies which are mounted on fixed and swivel bases.

9 Claims, 8 Drawing Sheets

MOBILE HYDRAULIC HOIST

This application claims the benefit of U.S. Provisional Patent Application No. 60/408,982 filed Sep. 9, 2002.

FIELD OF INVENTION

The present invention relates generally to hoist units of the type useful in lifting and transporting heavy but relatively compact loads.

More particularly, the invention relates to a mobile hoist unit having, in combination, wheel assemblies which permit use of the hoist unit on any of various terrains and surfaces, a boom operated by a power cylinder, and provision of support means which permit travel of the hoist unit over smooth surfaces as well as rough terrain and ground without danger of hazardous shifting or loss of the load being transported by the unit.

DESCRIPTION OF PRIOR ART

The prior art is replete with proposals for hoists intended for use in lifting and manually moving motors, molding dies and like heavy loads within warehouses, factories, auto and truck repair shops and similar facilities with relatively flat and smooth cement floors. Such prior proposals generally show hoists equipped with relatively small caster type wheels which are quite adequate for use where floors are level and movement generally is accomplished manually. Also such prior hoists generally do not provide means for restraining the load against shifting and swinging relative to the hoist during movement since the combination of level surfaces and slow controlled manual movement of the hoist is not likely to result in uncontrollable shifting or swinging of the load. Examples of prior art devices of the type discussed above are shown in such U.S. Pat. Nos. 2,974,809; 4,090,625; 4,925,039; and 5,082,127.

Other prior art shows hoist devices with larger wheel assemblies which might be suitable for use in streets and alleys and on other terrains with bumps, ruts and potholes. Such devices, however, do not involve use of hydraulically operated booms with suspended hooks capable of hooking a chain or rope to pick up and move a motor or the like, but rather they are directed toward truck and trailer type devices intended to move large containers such as those used in dispose of garbage, trash, demolition materials and the like. Examples of devices of this nature are illustrated in such representative U.S. Pat. Nos. 3,378,155; 4,049,143; 4,213,728; 5,082,082; and 5,678,977.

Thus, the prior art provides both manually movable hoist devices suitable for use with relatively compact loads within facilities having reasonably flat and level floors, and transport devices suitable for use on streets and other exterior terrains for hauling large quantities of materials. It does not, however show or suggest a readily maneuverable device having in combination hitch means for releasable attachment to a towing vehicle, wheel assemblies adapted for use both on flat interior floors and various exterior surfaces and terrains, a power operated boom member for elevating and supporting and depositing a relatively compact heavy load, and means for stabilizing the load during transport.

SUMMARY OF INVENTION

The general aim of the present invention is to provide a new and improved mobile hoist adapted to easily and safely retrieve, secure and move heavy loads over a variety of surfaces and terrains using any of several types of towing vehicles.

Detailed objectives of the invention are:

To provide a mobile hoist having a boom operated by a power cylinder and provided with wheel assemblies which permit use of the hoist on a variety of interior surfaces and exterior terrains, which hoist may be hitched to and moved by any of various towing vehicles appropriate for the surface or terrain to be traversed.

The provision of a mobile hoist having a rearwardly open "U" shaped frame which permits positioning of the load within the frame for ease of pick-up, there being provision for supporting and securing the load against undesired movement relative to the hoist during its transport.

These and other objectives, features and advantages of the present invention will become more apparent from the following detailed description of the preferred embodiments when taken in conjunction with the accompanying drawings.

INTRODUCTION

Throughout this application, certain words are used for convenience only and are not to be construed as limiting. The word "fluid" is used in its broadest sense to refer to any substance that flows, including liquids, gasses and viscous substances. The term "power cylinder" includes all types of power generating cylinders and similar devices involving moving piston rods to impart power whether operated by a fluid such as compressed air (pneumatic cylinders) or a fluid such as oil (hydraulic cylinders). Additionally, in the drawings, like elements in the same or different embodiments have been identifies with like reference numerals throughout. And where a particular element may be shown numerous times in the same drawing view, it may not be identified each time it is shown in that view, and all elements shown in one view of an embodiment may not be shown in all other views of that same embodiment.

Detailed Description—First Embodiment

Figure 1:
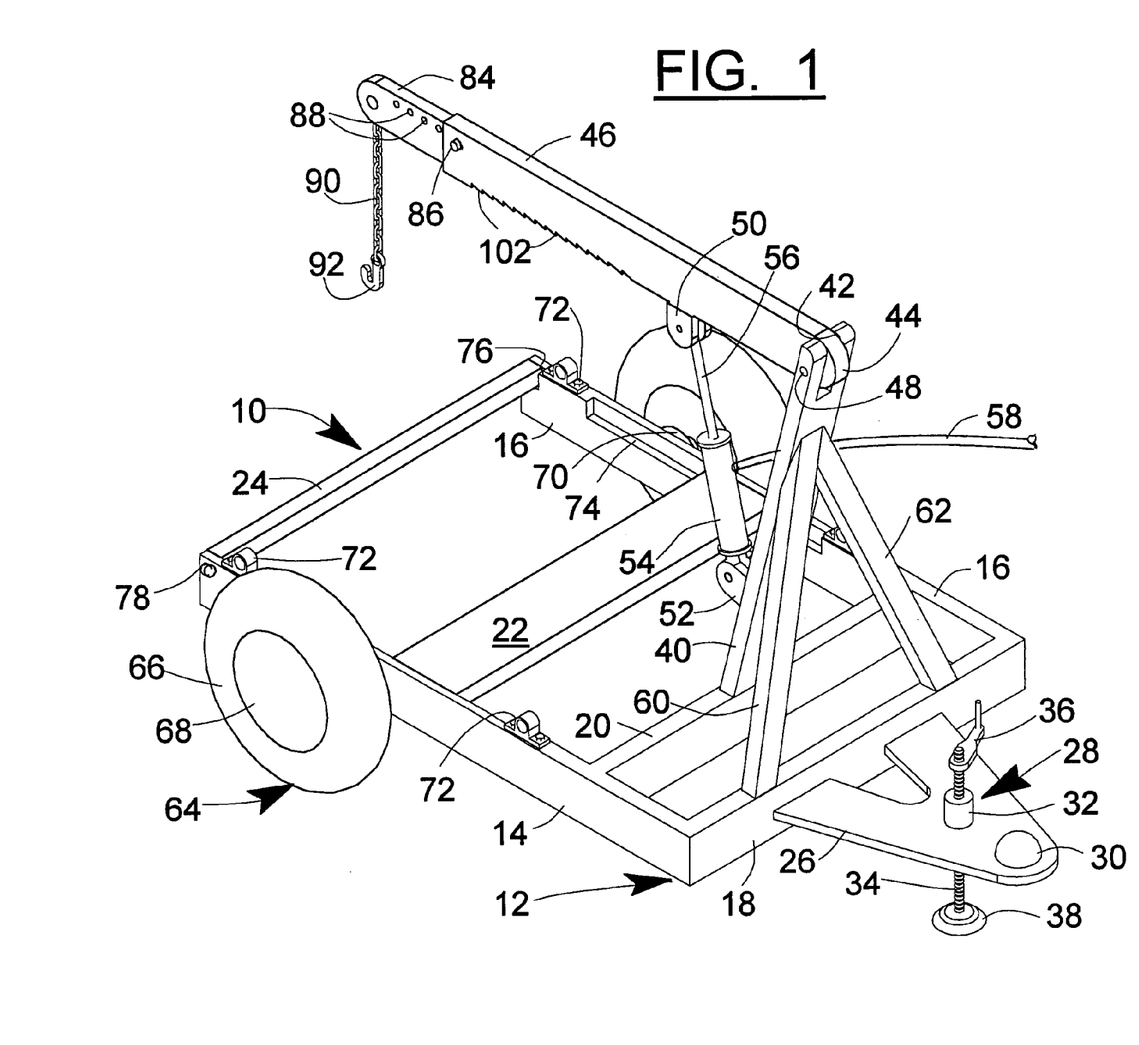
FIG. 1 is a front perspective view of a preferred embodiment of a new and improved mobile hoist incorporating the unique aspects of the present invention.

Continuing now with a more detailed description of the drawings, reference is made to FIG. 1 showing in perspective a mobile hoist 10 comprising a base frame 12 consisting of generally parallel spaced side members 14 and 16 connected at their forward ends by a connecting section comprised of spaced outer and inner cross members 18 and 20, respectively. Support members 22 and 24 extend between and rest on side members 14 and 16 but are removable therefrom for a purpose to be described in greater detail herebelow.

Extending forwardly of base frame 12 is a hitch 26 having a foot assembly 28 which supports the front of the hoist 10 when not connected by socket 30 to a towing vehicle. The foot 28 consists of a bushing 32 mounted on hitch 26, with a threaded rod 34 extending vertically through the bushing. The threaded rod 34 is manually rotatable using handle 36 to raise and lower the front of the hoist as necessary to connect to the towing vehicle. Also, of course, before towing the hoist, the rod 34 should be raised (see FIG. 4) to prevent damage to the pad 38 as mounted on the lower end of rod 34. Should it be desired for ease of manually moving or repositioning the hoist while it is being used in a shop or warehouse with relatively smooth floors, the pad 38 may be modified readily to accommodate a swivel or ball castor or like anti-friction device 39 projecting below the bottom surface of pad 38 and adapted to support the front end of the hoist while permitting manual multidirectional movement thereof over the front or other surface on which the hoist is positioned when the hitch 26 is not supported by a towing vehicle.

Welded or otherwise securely attached to inner cross member 20 of the base fame 12 is an upwardly extending boom support or bar 40 having a slotted upper end 42 in which the inner end 44 of boom 46 is pivotally mounted by pivot pin 48. Positioned between and carried by boom bracket 50 and bar bracket 52 is a power cylinder 54 having a piston rod 56 which is extendible and retractable to pivot the outer end of boom 46 vertically around pivot pin 48 between upper and lower positions.

It will be understood by those in the art that, to operate piston 54 to raise the outer end of boom 44, it is necessary to provide means for pressurizing the power cylinder such as a hydraulic pump, air compressor or other appropriate source (not shown). A high pressure hose line 58 extends between the pressure source and cylinder 54, with appropriate valving means (not shown) being provided for selectively controlling the transmission of pressure through line 58. As such pressure components are well known and commonly used in the industry, their detailed inclusion herein is not believed necessary or desirable.

Fixed to and carried by outer cross member 18 of base frame 12 are braces 60 and 62 which angle upwardly toward each other and terminate in a composite upper end attached to boom support 40. Thus, the braces 60 and 62 hold boom support 40 rigidly against movement either laterally or longitudinally with respect to the base frame 12.

Figure 2:
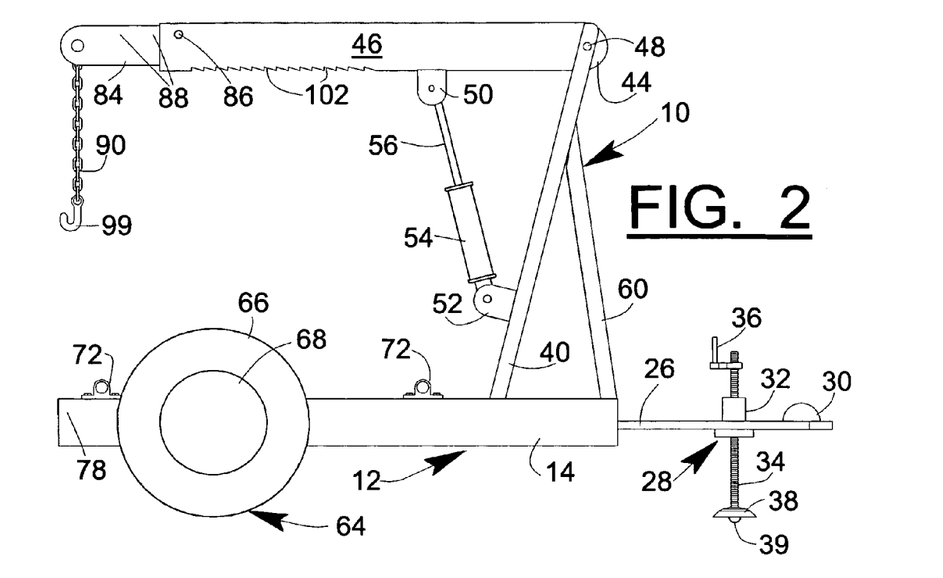
FIG. 2 is a side elevational view of the hoist shown in FIG. 1.
Figure 3:
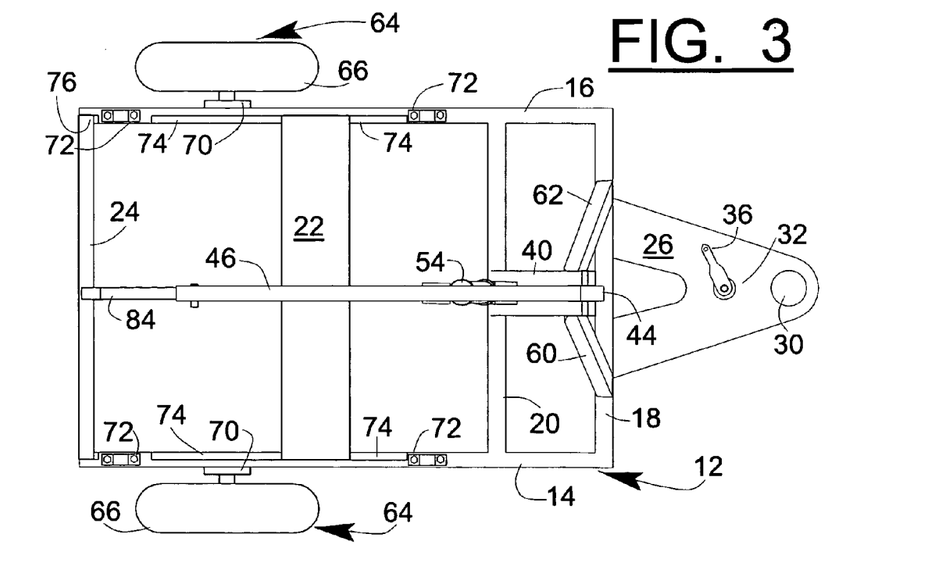
FIG. 3 is a top plan view of the hoist shown in FIG. 1.

Attached to and carried by the outer surface of each side member 14 and 16, is a wheel assembly 64 comprising a tire 66, a rim 68 and a bearing assembly 70. The tires 66 preferably are of the pneumatic type with tough wear resistant semi-resilient treads suitable for use on a variety of surfaces and terrains, whether smooth and level or rough and hilly or inside a shop or warehouse or outside in a salvage yard, farm yard or construction site. As can best be seen from FIGS. 2, 3 and other later figures, the wheel assemblies 64 preferably are positioned toward the rearward end of the side members 14 and 16 to assure that the weight of any loads to be lifted and transported by the hoist generally will be located between the wheel assemblies 64 and the hitch 26.

An additional feature of the base frame 12 comprises the provision of tie-downs 72 which are secured at spaced locations on the upper edge of side members 14 and 16 to permit securement of loads carried by the hoist 10 using rope, chain, wire, or other suitable tether item.

Also, it should be noted that the side members 14 and 16 provide for the reception and releasable retention of support members 22 and 24. In the embodiment illustrated in FIGS. 1 through 9, this feature is provided by two sets of upwardly open inwardly facing opposed indents sized to receive and support the opposite ends of support members 22 and 24. The first set 74 comprises relatively long indents in which support member 22 is slidable longitudinally of the frame 12 in order to permit its optimal placement under a load as it is being readied for movement. The second set comprises relatively short indents 76 located at the rearward end of side members 14 and 16 and sized to receive the ends of support member 24. The ends of support member 24 preferably are releasably anchored in indents 76 by pins or bolts 78 pushed through appropriate apertures in the side members 14 and 16. For reasons which will be clear from the following description, such pins or bolts 78 should be readily removable to permit removal of support 24 from the frame 12.

Figure 4:
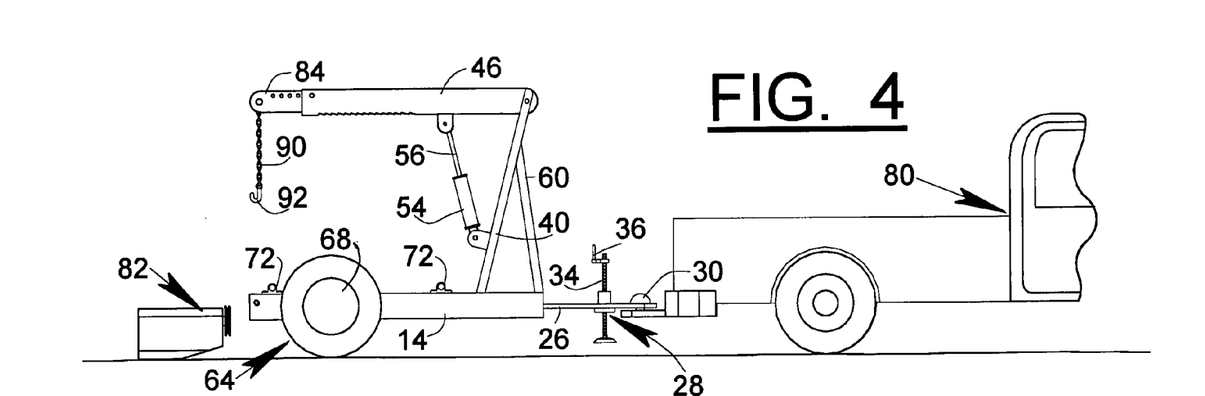
FIG. 4 is a side elevational view of the hoist of FIG. 1 hitched to a towing vehicle, with the hoist being positioned to approach a motor to be picked up and moved by the hoist.
Figure 5:
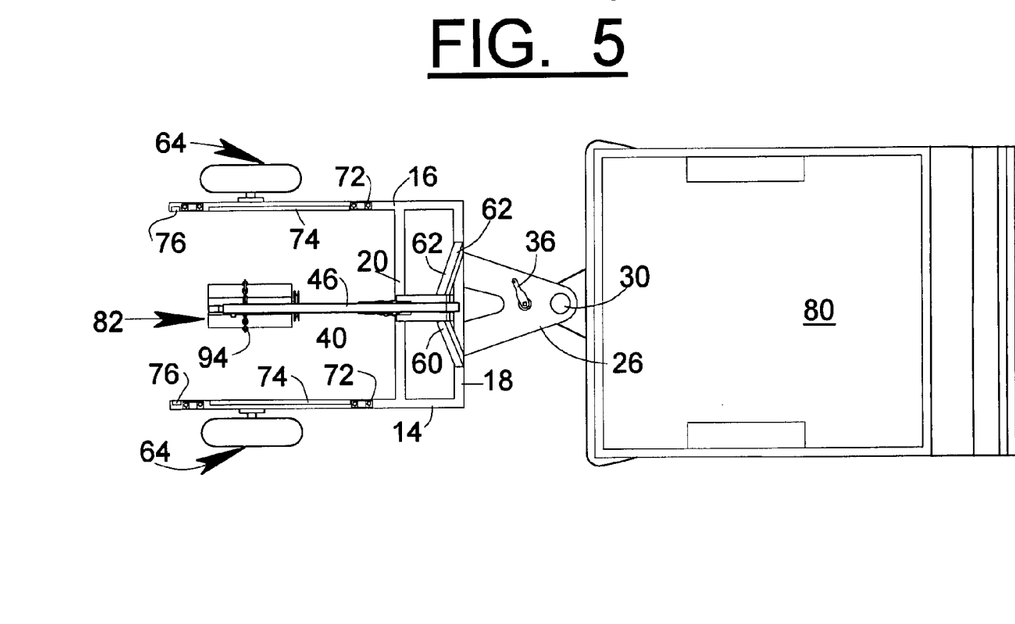
FIG. 5 is a top plan view of the hoist and towing vehicle illustrated in FIG. 4, with the motor positioned within the rearwardly open frame of the hoist and the boom shortened and lowered, and its hook attached to the lift chain provided on the motor.
Figure 6:
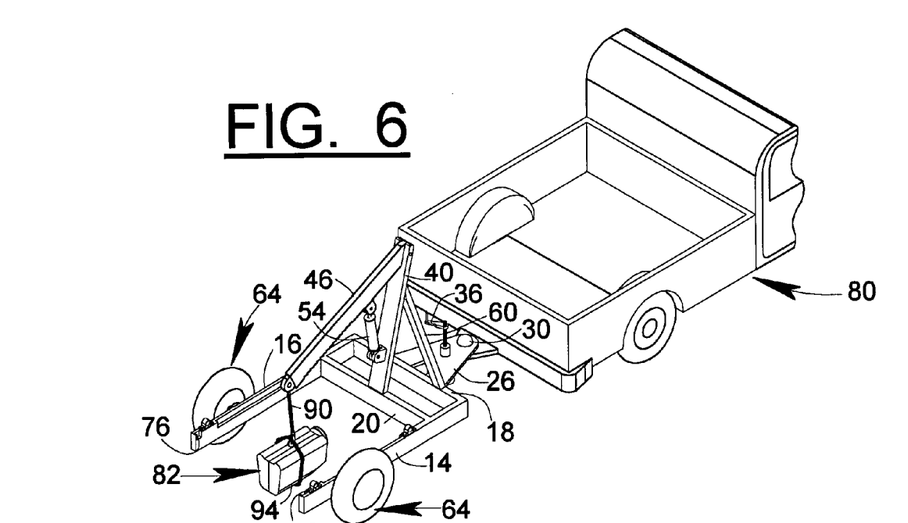
FIG. 6 is a rear perspective view of the hoist, towing vehicle and motor as shown in FIG. 5.

Referring now to FIGS. 4 through 9, it will be seen that hoist 10 has been hitched to a towing vehicle such as a pick-up truck 80 having a hitch ball disposed in socket 30, with foot 28 being raised to clear the surface over which the hoist 10 is to be moved. FIG. 4 shows the hoist 10 in position to be backed toward a motor block 82 which is located on the ground or floor and which is to be picked up and moved to another location. FIG. 5 shows a top view of the hoist 10 after being backed to a pick-up position with the motor generally centered in the rearwardly open center section of the frame 12 and with the boom 46 lowered. It will be noted from this view that support members 22 and 24 are not present, having been removed prior to movement of hoist 10 from the FIG. 4 to the FIG. 5 position to avoid interference with positioning of the hoist 10 over motor 82.

It should be noted at this point that the outer end of boom 46 is comprised of a relatively short end piece 84 which is telescopically movable relative to the primary inner portion of boom 46 between an extended position illustrated in FIGS. 1 through 4 and a retracted position illustrated in FIGS. 5 through 9. As will be understood by those in the art, with a device of the general nature of hoist 10, it often is helpful to be able to adjust the length of a boom to compensate for differences in the size, weight and/or position of the load to be picked up. After making any appropriate adjustments in the position of the end piece 84, it is then locked in position by passing anchor pin 86 through aligned apertures in the primary inner portion of boom 46 and one of the series of aligned apertures 88 in end piece 84.

The end piece 84 of boom 46 includes a downwardly depending chain 90 terminating on its lower end in a hook 92 which is shown in FIGS. 5 through 9 as being engaged with a lift chain or strap 94 encircling motor 82.

Figure 7:
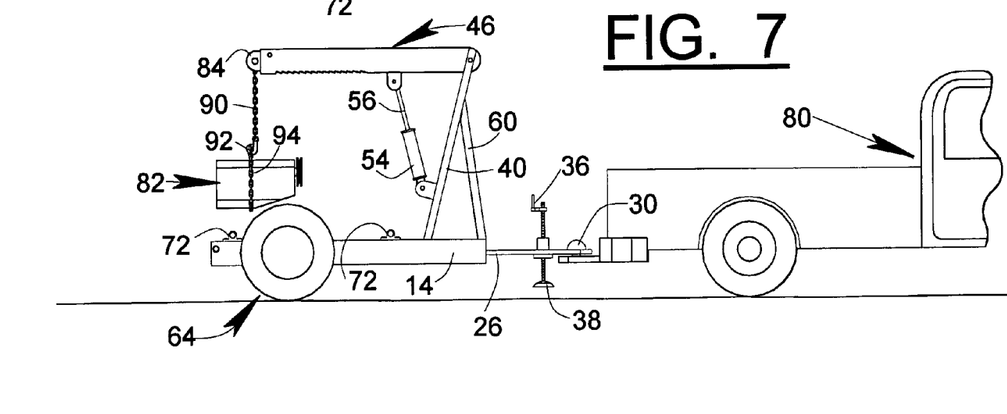
FIG. 7 is a side elevational view of the hoist and towing vehicle shown in FIG. 5, with the motor lifted to a position above the top of the frame of the hoist.
Figures 8, 9:
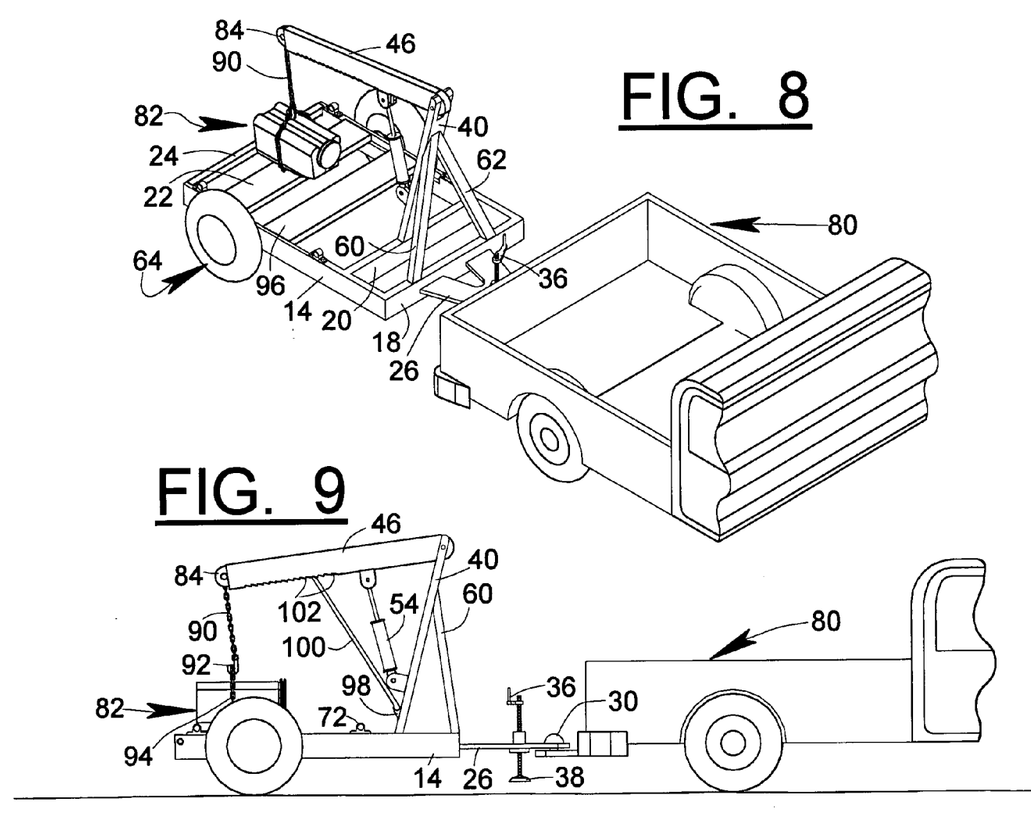
FIG. 8 is a front perspective view of the hoist and towing vehicle shown in FIG. 7 with removable support members disposed on the frame of the hoist for reception of the motor.
FIG. 9 is a side elevational view of the hoist and towing vehicle of FIG. 8, showing the motor as being positioned on and supported by the support members, there being a brace positioned between the boom and boom support bar.

FIG. 7 shows the boom 46 as being raised by cylinder 54 to a substantially horizontal position in which the motor 82 is suspended above the top edge of frame 12. While the motor 82 is so suspended, the support members 22 and 24 are repositioned on frame 12 in the indents 74 and 76. Also, if appropriate or necessary, an additional support member 96 (see FIG. 8) may be placed in the indents 74 to assist in supporting the load to be transported. After the insertion and/or positioning of the support members in indents 74 and 76, the motor 82 should then be lowered onto the support members as shown in FIG. 9, while still retaining some upward tension on the load to assist in stabilizing it on supports 22, 24 and 96. Additionally, should it be anticipated that the hoist and load will have to be towed over relatively rough terrain, the load can be further stabilized by strapping or chaining it to the tie-downs 72.

Should it be anticipated that an unusually heavy load is to be transported or that unusual stresses may be placed on the boon 46 during transport, provision is made for a supplemental brace for boom 46. As shown in FIG. 9, such supplemental bracing includes a trough like member 98 fixed transversely on boom support 40, with a rigid brace 100 being positioned between trough 98 and one of the forwardly facing offsets or notches 102 (see FIG. 2) provided along the bottom surface of boom 46. As will be readily apparent, selection of the particular notch 102 to be used in supporting the boom 46 will depend upon the positioning of the boom 46 as related to the trough 98.

Upon approaching the point where the motor 82 is to be unloaded, any brace 100 and any strapping or chaining of the load to the tie-downs 72 are first removed, and the load then raised for removal of support members 22, 24 and 96 if used. Thereafter, the hoist may be backed to a position where the frame 12 straddles the motor stand, work table or floor area on which the load is to be deposited, and the deposit then made by the controlled release of pressure from the power cylinder 54. Upon completion of such deposit, the hook 86 should be disengaged from lift chain 90 and the boom 46 raised, whereafter the hoist 10 may be moved to other locations.

Detailed Description—Second Embodiment

Figure 10:
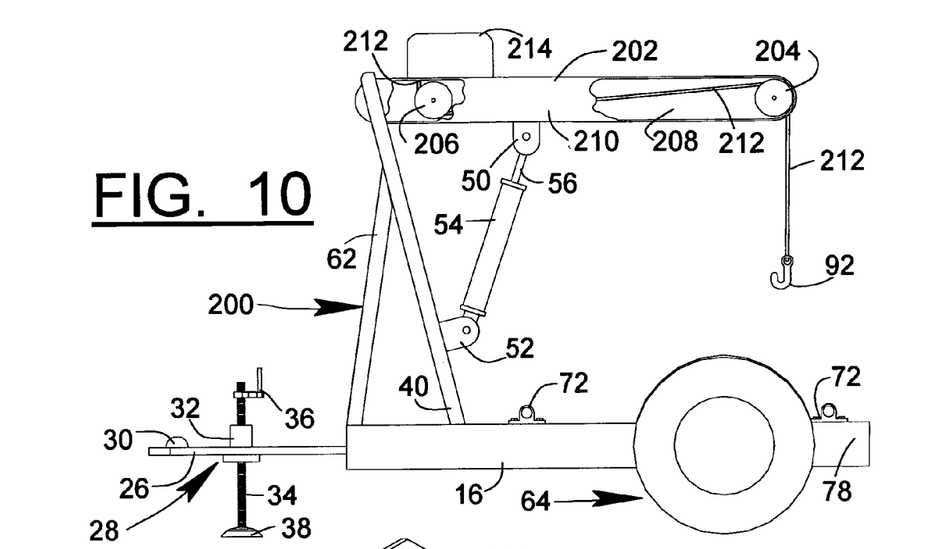
FIG. 10 is a side elevational view of another embodiment of a mobile hoist according to the present invention, wherein the boom is not adjustable in length and is provided with a motorized pulley system for assisting in lifting loads to be transported by the hoist.
Figure 11:
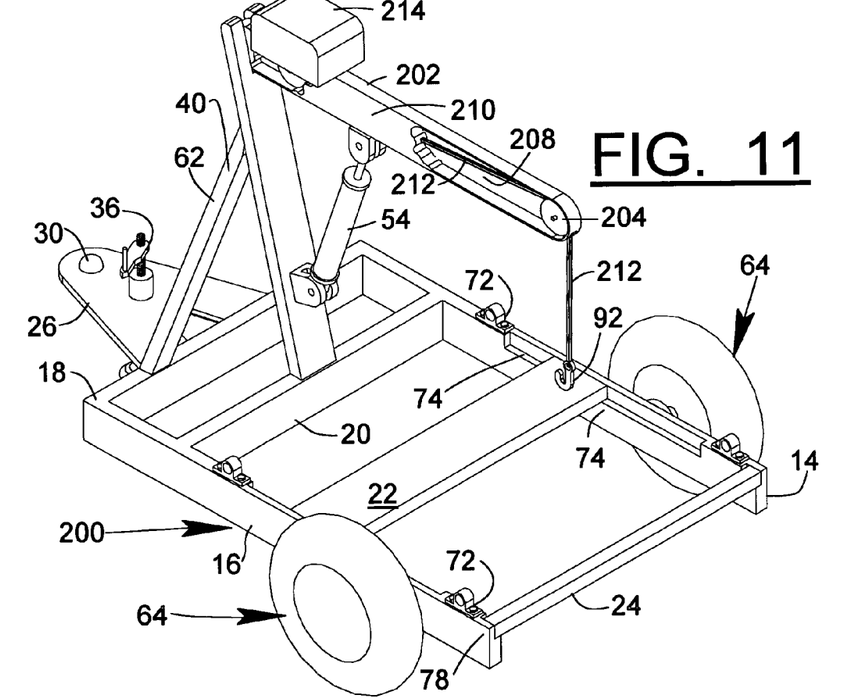
FIG. 11 is a rear perspective of the hoist of FIG. 10.

The hoist 200 illustrated in FIGS. 10 and 11 is substantially the same as the above described embodiment, except for the construction and operation of the boom. Thus, it is not believed necessary at this point to repeat for all of the parts and components which are common to both embodiments, the detailed descriptions provided hereinabove with respect to the first embodiment.

In this second embodiment 200, the boom is not equipped with an extendible and retractable end piece 84 or fixed chain 90, but rather it is provided with a supplemental load transport system using a selectively operable cable winding assembly with a movable cable intended to supplement and/or speed up the lifting of loads by the power cylinder. More particularly, the boom 202 is generally hollow and provided internally with outer and inner pulleys 204 and 206 journaled between opposed sides 208 and 210 of boom 202. Threaded over the top of outer pulley 204 and under inner pulley 206 is a flexible cable 212.

The outer end of cable 212 depends downwardly from outer pulley 204 and terminates in a hook 92. The inner end of cable 210 extends upwardly from pulley 206 into power unit 214 in operating engagement with a speed reducer driven by an electric motor which is manually controlled by a remote switch (not shown). As will be understood, the ratings of the electric motor and speed reducer should be selected to provide the capability of generating torque sufficient to draw cable 212 inwardly and lift any load likely to be handled by hoist 200. In some instances, the operator of the hoist 200 may have reason to use the electric motor driven cable system 212 exclusively in lifting a load, in other instances only the power cylinder 54 may be used, and in yet other cases both the power cylinder 54 and cable system 212 may be used to pick up and/or discharge a load.

Detailed Description—Third Embodiment

Figure 12:
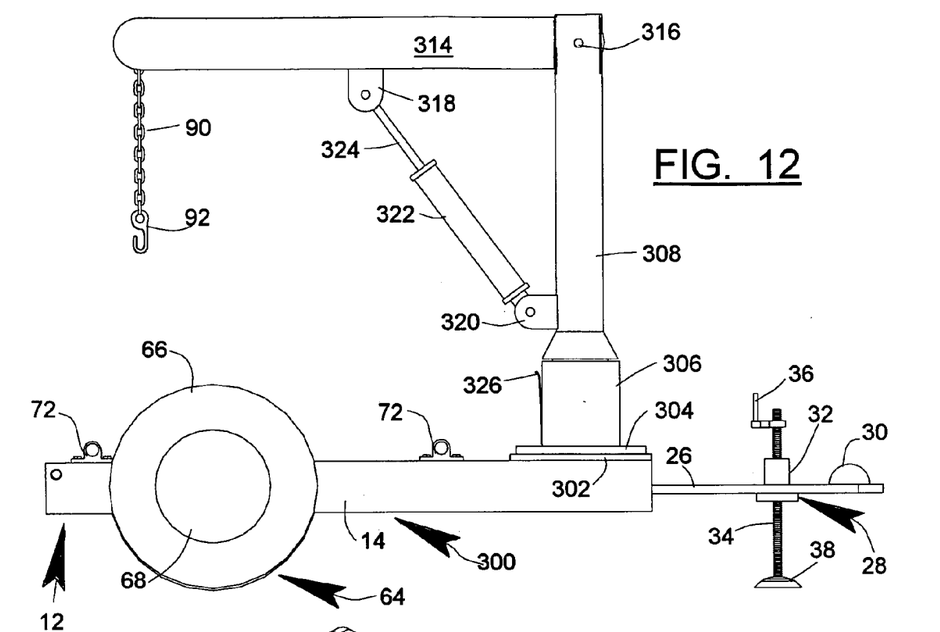
FIG. 12 is a side elevational view of another embodiment of a mobile hoist according to the present invention wherein the boom and boom support are rotatable relative to the longitudinal axis of the hoist.
Figure 13:
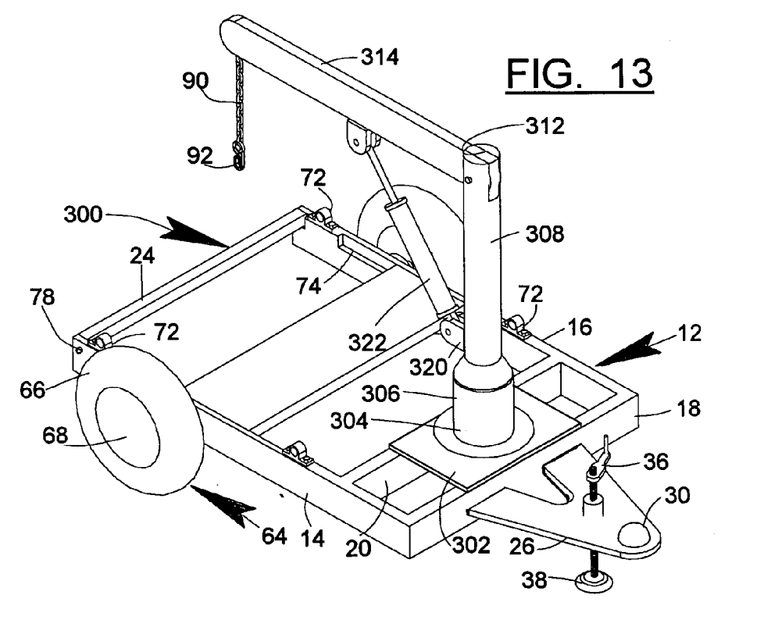
FIG. 13 is a front perspective of the hoist embodiment shown in FIG. 12.

The third embodiment of the invention comprises a hoist 300 having a base frame 12 comprising spaced parallel side members 14 and 16 connected at their forward ends by connecting section consisting of spaced outer and inner cross members 18 and 20. Support members 22 and 24 extend between and rest on side members 14 and 16.

Extending forwardly of frame 12 is a hitch 26 having a foot assembly 28 which supports the front of the hoist 10 when it is not connected by socket 30 to a towing vehicle. The foot 28 consists of a bushing 32 mounted on hitch 26, with a threaded rod 34 extending vertically through the bushing. The threaded rod 34 is manually rotatable using handle 36 to raise it preparatory to movement of the hoist 300, and to raise and lower the front of the hoist as necessary to connect to the towing vehicle.

As in the first embodiment, the outer surface of each side member 14 and 16, carries a wheel assembly 64 comprising a tire 66, a rim 68, and a bearing assembly 70. The wheel assemblies 64 preferably are positioned toward the rearward end of the side members 14 and 16 to assure that the primary weight of any loads to be lifted and transported by the hoist will be located between the wheel assemblies 64 and the hitch 26. Also, the base frame 12 provides tie-downs 72 which are secured at spaced locations on the upper edge of side members 14 and 16 to permit securement of loads carried by the hoist 300 using rope, chain, wire, or other suitable tether item. Further, as with the earlier embodiments, the side members 14 and 16 provide for the reception and releasable retention of support members 22 and 24 for use as described heretofore.

Positioned on and welded or otherwise securely fixed to cross members 18 and 20 is a generally rectangular plate 302. A generally circular mounting member 304 is secured to plate 302, and fixed to the mounting member 304 is an upwardly open base section 306. Rotatably positioned in base section 306 is the lower end of cylindrical boom support 308 terminating in a slotted upper end 312 in which the inner end of boom 314 is pivotally mounted by pivot pin 316. Positioned between and carried by boom bracket 318 and support bracket 320 is a power cylinder 322 having a piston rod 324 which is extendible and retractable to pivot the outer end of boom 314 around pivot pin 316 between upper and lower positions.

Figures 14, 15:
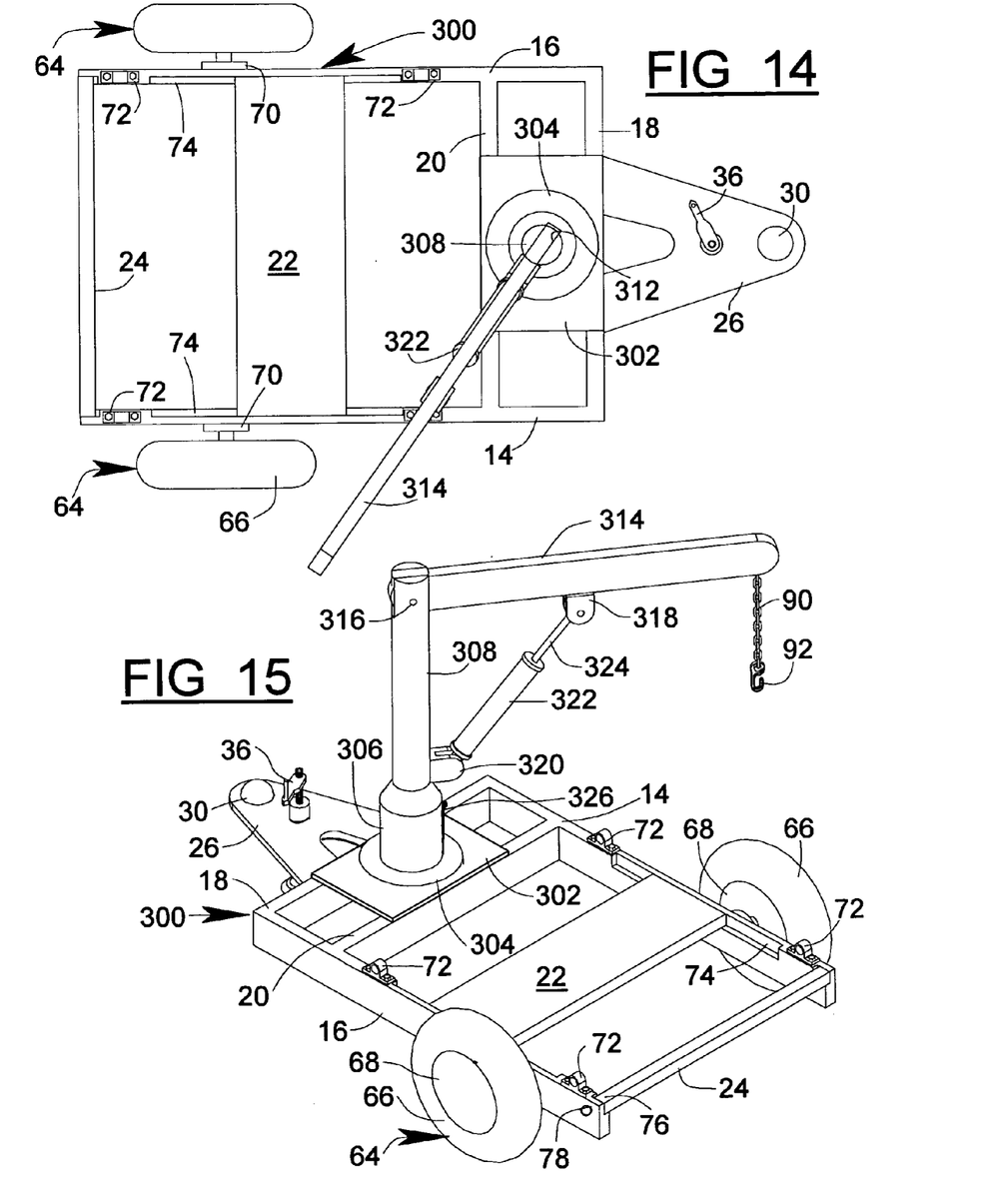
FIG. 14 is a top plan view of the embodiment of FIG. 12, showing the boom and boom support as being rotated relative to the longitudinal axis of the hoist.
FIG. 15 is a rear perspective view of the embodiment of FIG. 12 showing the boom rotated pursuant to FIG. 14.

As best shown in FIGS. 14 and 15, the boom support 308, boom 314 and power cylinder 322 are rotatable as a unit around an axis extending perpendicularly of the center of plate 302. In most instances the hoist 300 would be used with the boom 314 in a centered balanced position as illustrated in FIGS. 12 and 13, but on occasion it may be necessary or desirable because of space limitations or other reasons to pick up a load from a position which is off-center of the space between side members 14 and 16, or even from a position outside of the frame 12. Likewise, it may be desirable to deposit a load in such an off-center or outside position.

Various arrangements may be used to releasably maintain the boom 314, support assembly 304 and cylinder 322 in a center position or in any rotated position that might be necessary or desired. In the present embodiment, however, such arrangements preferably include a plurality of circumferentially spaced vertical slots in the lower end of boom support 308, a single slot in the wall of base section 306, and a blade member (not shown) insertable through the slot in the base section 306 into a selected slot in the lower end of boom support 308. As so engaged, the blade will restrain the boom support 308 and hence the boom 314 and cylinder 322 from any rotation relative to the base section 306.

The blade preferably is mounted on a readily grasped spring handle 326 which is simply flexed outwardly to disengage the blade from any of the slots in boom support 308 which can then be rotated to any desired position, at which time the handle 126 may be released to engage the slot in the boom support 308 which is located at that position. Such engagement will restrain boom support 308 against movement until the handle 326 is again flexed outwardly.

From the foregoing, it will be apparent that many modifications and variations of the present invention are possible in light of the teachings of this application. It is to be understood, therefore, that the foregoing descriptions and appended drawings are illustrative only and are neither intended nor are they to be taken as limiting the scope of this invention.

I claim:

1. A mobile hoist for lifting, transporting and depositing relatively heavy compact loads, said mobile hoist comprising
   a substantially "U" shaped base frame comprising
      a forward connecting section,
      a pair of spaced generally parallel side members fixed to and extending rearwardly of said connecting section and forming therewith a rearwardly open space within said base frame,
      means for supporting the mobile hoist for movement over a variety of finished surfaces and unfinished terrains, said support means comprising
         a wheel assembly affixed to each of said side members proximate its rearward end externally of said rearwardly open space, and
         each said wheel assembly having a tire with a tread suitable for use on a variety of finished surfaces and unfinished terrains,
   a hitch member extending forwardly of said connecting section for releasable engagement with a source of motive or manual power,
   a foot assembly carried by said hitch member for supporting the front of the mobile hoist when said hitch member is not engaged with or resting on a towing vehicle or other source of support or motive or manual power, said foot assembly comprising
      a vertically disposed manually rotatable rod threadedly engaged with said hitch member,
      a pad assembly carried on the lower distal end of said threaded rod for contact with the surface on which the mobile hoist is positioned,
   a boom support positioned generally centrally on and projecting upwardly from said connecting section,
   at least a pair of braces positioned on said connecting section at locations spaced from the location of said boom support, said braces extending upwardly from said connecting section for fixed engagement with said boom support proximate its upper distal end to restrain said boom support against undesired movement relative to said base frame,
   a boom journaled on said boom support proximate its upper distal end for limited pivotal movement thereon in a generally vertical plane,
   a fluid operated power cylinder having a piston rod journaled on said boom, said rod being selectively extendible and retractable to pivot said boom between its said upper and lower positions,
   means for selectively actuating said power cylinder to pivot said boom between said lower and upper positions, said actuating means comprising a manually operable control for selectively
      supplying fluid under pressure to said power cylinder to extend said piston rod and pivot said boom upwardly, and
      releasing fluid from said power cylinder to permit retraction said piston rod and movement of said boom downwardly,
   a load bearing member
      depending from the outer distal end of said boom, and
      being releasably engagable with a load upon movement of said mobile hoist to a location proximate the load and said boom to a vertical position wherein said load is attachable to said load bearing member,
   said parallel side member being provided with means for stabilizing a load against undesired movement relative to the base frame after such load has been lifted and positioned for transportation,
   said load stabilizing means comprising
      a plurality of tie-downs secured at spaced locations on said side members, and
      at least one support member positioned transversely across said rearwardly open space and provided with ends adapted to rest securely but movably on said side members to permit positioning of said support member for reception thereon of at least part of the weight of the load.

2. A mobile hoist according to claim 1, characterized by said boom having a positioning aperture proximate its outer distal end,
   an end place telescopically moveable relative to said boom between retracted and extended positions,
   a plurality of aligned latching apertures spaced longitudinally in said end piece for individual alignment with said positioning aperture in response to selective movement of said end piece relative to boom, and
   a pin member sized for reception in said positioning aperture and any one of said latching apertures upon alignment thereof with said positioning aperture for releasably fixing said end piece in a desired position on said boom.

3. A mobile hoist according to claim 1, characterized by said power cylinder being a pneumatic cylinder and said fluid being a gaseous substance.

4. A mobile hoist according to claim 1, characterized by said power cylinder being a hydraulic cylinder and said fluid being a hydraulic oil.

5. A mobile hoist according to claim 1, characterized by
said connecting section comprising a pair of horizontally spaced parallel inner and outer cross members extending between and fixed to said side members,
said boom support being fixed generally centrally to and extending upwardly from said inner cross member, and
said braces being fixed to and extending upwardly from spaced locations on said outer cross member and angling into fixed engagement with said boom support.

6. A mobile hoist according to claim 5, characterized by
at least one support member positioned transversely across said rearwardly open space within said base frame, said support member being of such length that its ends are positionable for reception by said side members, and
said side members releasably receiving said ends of said support member whereby said support member is manually positionable on said side members for reception by said support member of at least part of the weight of said load during its movement.

7. A mobile hoist according to claim 6, characterized by inwardly facing upwardly open indents provided in said side members, said indents being generally coextensive with one another and adapted to slidingly receive said ends of said support member to permit movement of said support member relative to said side members for reception thereon of said load.

8. A mobile hoist according to claim 1, characterized by said foot assembly providing a swivel roller assembly positioned to contact the surface on which the mobile hoist is positioned and to permit multidirectional movement thereof over such surface.

9. A mobile hoist according to claim 1, characterized by manually positionable bracing for electively supporting said boom against undesired movement while under stress of a heavy load, said bracing comprising:
a base member fixed relative to said boom support,
a series of offset notches provided along the bottom surface of said boom, and
an elongated rigid brace removably positional between said base member and a selected one of said offset notches.

* * * * *